US012559621B2

(12) United States Patent
Leucht et al.

(10) Patent No.: US 12,559,621 B2
(45) Date of Patent: Feb. 24, 2026

(54) COATED MICROFIBROUS WEB AND METHOD FOR PRODUCING THE SAME

(71) Applicant: MAVIG GmbH, Munich (DE)

(72) Inventors: Thomas Leucht, Fulda (DE); Gaby Streit, Munich (DE)

(73) Assignee: MAVIG GmbH, Munich (DE)

( * ) Notice: Subject to any disclaimer, the term of this patent is extended or adjusted under 35 U.S.C. 154(b) by 741 days.

(21) Appl. No.: 17/640,373

(22) PCT Filed: Aug. 5, 2020

(86) PCT No.: PCT/EP2020/072017
§ 371 (c)(1),
(2) Date: Mar. 24, 2022

(87) PCT Pub. No.: WO2021/032486
PCT Pub. Date: Feb. 25, 2021

(65) Prior Publication Data

US 2022/0243053 A1 Aug. 4, 2022

(30) Foreign Application Priority Data

Aug. 16, 2019 (DE) ..................... 10 2019 005 746.5

(51) Int. Cl.
*C08L 67/02* (2006.01)
*B32B 37/00* (2006.01)
(Continued)

(52) U.S. Cl.
CPC .......... *C08L 67/02* (2013.01); *B32B 37/0038* (2013.01); *C09D 175/04* (2013.01);
(Continued)

(58) Field of Classification Search
CPC ............... C08L 67/02; C08L 2205/025; C08L 2205/035; D06M 13/2035;
(Continued)

(56) References Cited

U.S. PATENT DOCUMENTS 4,923,741 A 5/1990 Kosmo et al.
8,803,115 B2 * 8/2014 Leucht ................ D06M 15/295 442/131
2012/0181458 A1 * 7/2012 Leucht .................. D06N 3/183 442/72

FOREIGN PATENT DOCUMENTS

DE 3046713 * 9/1981
DE 3046713 A1 9/1981
(Continued)

OTHER PUBLICATIONS

International Preliminary Report on Patentability issued Feb. 17, 2022 in International Application No. PCT/EP2020/072017 (English Translation Only).
(Continued)

*Primary Examiner* — Camie S Thompson
(74) *Attorney, Agent, or Firm* — Panitch Schwarze Belisario & Nadel LLP

(57) ABSTRACT

A coated microfibrous web, a method for producing the same, the use thereof as a covering of a radiation protection material, and a radiation protection device are described. The coated microfibrous web contains: (i) a microfibrous web containing one or more polyesters and/or one or more polyamides and/or one or more polyamide-polyester copolymers and having an impregnation composition containing (a) an aromatic dicarboxylic acid, the dicarboxylic groups of which are each esterified with a diol, and/or (b) one or more oligomers, each containing 2 to 10 repeat units consisting of a monoester of an aromatic dicarboxylic acid impregnated with a diol; and (ii) a layer comprising polyurethane which is present only on one side of the microfibrous web.

10 Claims, 1 Drawing Sheet

(51) Int. Cl.

| | |
|---|---|
| ***C09D 175/04*** | (2006.01) |
| ***D06M 13/02*** | (2006.01) |
| ***D06M 13/148*** | (2006.01) |
| ***D06M 13/203*** | (2006.01) |
| ***D06M 13/224*** | (2006.01) |
| ***D06M 15/507*** | (2006.01) |
| ***D06M 15/564*** | (2006.01) |
| ***D06M 15/643*** | (2006.01) |
| ***D06M 101/32*** | (2006.01) |
| ***D06M 101/34*** | (2006.01) |
| ***G21F 1/12*** | (2006.01) |
| ***G21F 3/00*** | (2006.01) |

(52) U.S. Cl.
CPC .......... *D06M 13/02* (2013.01); *D06M 13/148* (2013.01); *D06M 13/2035* (2013.01); *D06M 13/2246* (2013.01); *D06M 15/507* (2013.01); *D06M 15/564* (2013.01); *D06M 15/643* (2013.01); *G21F 1/125* (2013.01); *G21F 3/00* (2013.01); *C08L 2205/025* (2013.01); *C08L 2205/035* (2013.01); *D06M 2101/32* (2013.01); *D06M 2101/34* (2013.01); *D06M 2200/35* (2013.01)

(58) Field of Classification Search
CPC ......... D06M 2101/32; D06M 2101/34; D06M 2202/35; D06M 7/00; D06M 13/02; D06M 13/148; D06M 13/2243; D06M 13/2246; D06M 15/507; D06M 15/583; D06M 15/643; B32B 37/0038; D06N 2209/048; D06N 2209/105; D06N 3/004; D06N 3/14; G21F 1/125; G21F 3/00
USPC ............................................................ 442/60
See application file for complete search history.

(56) References Cited

FOREIGN PATENT DOCUMENTS

| | | | |
|---|---|---|---|
| DE | 102009037565 A1 | | 2/2011 |
| JP | 11302980 | * | 11/1999 |
| WO | 2011018459 A1 | | 2/2011 |

OTHER PUBLICATIONS

Search Report issued Mar. 30, 2020 in DE Application No. 102019005746.5.

* cited by examiner

COATED MICROFIBROUS WEB AND METHOD FOR PRODUCING THE SAME

CROSS-REFERENCE TO RELATED APPLICATIONS

This application is a Section 371 of International Application No. PCT/EP2020/072017, filed Aug. 5, 2020, which was published in the German language on Feb. 25, 2021 under International Publication No. WO 2021/032486 A1, which claims priority under 35 U.S.C. § 119(b) to German Application No. 10 2019 005 746.5, filed Aug. 16, 2019, the disclosures of which are incorporated herein by reference in their entireties.

TECHNICAL FIELD

The present invention relates to a coated microfibrous web, a process for producing the same, an impregnating formulation which can be used in this process, the use of the coated microfibrous web as a cover of a radiation protection material as well as a radiation protection device.

TECHNICAL BACKGROUND

U.S. Pat. No. 4,923,741 discloses a flexible multi-layered cover which serves as a protection against dangers in space. The cover comprises inter alia a layer which, e.g., is to protect against braking radiation.

GB 2 118 410 A describes a radiation protection article which comprises at least one flexible layer of a lead-containing material which is enveloped by a knitted, woven or nonwoven fabric or is sandwiched between two layers of a knitted, woven or nonwoven fabric, wherein the knitted, woven or nonwoven fabric carries a coating of flexible polyurethane on its outer surface. However, the present inventors have found that such radiation protection articles having a polyurethane coating on the outer surface are subjected to a very high degree of abrasion when they are, e.g., used in medical applications.

Accordingly, it was an object of the present invention to provide a microfibrous web which has improved abrasion resistance and does not require any halogenated organic substances in the impregnation.

SUMMARY OF THE INVENTION

In one embodiment, the present invention relates to a coated microfibrous web comprising:

(i) a microfibrous web comprising one or more polyesters and/or one or more polyamides and/or one or more polyamide-polyester copolymers and impregnated with an impregnating composition comprising an aromatic dicarboxylic acid, the carboxylic acid groups of which are each esterified with a diol; and (ii) a layer comprising polyurethane which is present on only one side of the microfibrous web.

In this context, the "aromatic dicarboxylic acid, the carboxylic acid groups of which are each esterified with a diol" may be replaced by one ore more oligomers containing at least two (preferably not more than 10) repeating units consisting of a monoester of an aromatic dicarboxylic acid with a diol. This replacement may be performed in any of the subject-matters and embodiments of the present invention, i.e., in particular in the impregnating formulation, the impregnating composition as well as in the processes and products in which the impregnating formulation and/or the impregnating composition are used. However, it is preferred that the "aromatic dicarboxylic acid, the carboxylic acid groups of which are each esterified with a diol" is not replaced by an oligomer containing at least two (preferably not more than 10) repeating units consisting of a monoester of an aromatic dicarboxylic acid with a diol.

Moreover, along with the aromatic dicarboxylic acid, the carboxylic acid groups of which are each esterified with a diol, one or more oligomers containing at least two (preferably not more than 10) repeating units consisting of a monoester of an aromatic dicarboxylic acid with a diol may be contained in the impregnating composition or the impregnating formulation, respectively. This relates to all subject-matters and embodiments of the present invention, i.e., in particular the impregnating formulation, the impregnating composition as well as the processes and products in which the impregnating formulation and/or the impregnating composition are used. The weight ratio of "aromatic dicarboxylic acid, the carboxylic acid groups of which are each esterified with a diol" to "oligomer(s) containing at least two (preferably not more than 10) repeating units consisting of a monoester of an aromatic dicarboxylic acid with a diol" is preferably 1000 to 2, more preferably 500 to 20. However, it is preferred that along with the "aromatic dicarboxylic acid, the carboxylic acid groups of which are each esterified with a diol", an "oligomer containing at least two (preferably not more than 10) repeating units consisting of a monoester of an aromatic dicarboxylic acid with a diol" is not necessarily contained.

Herein, the term "oligomer" preferably relates to a compound exhibiting two to ten identical repeating units. In this context, it is preferred that the oligomer has a terminal diol at both ends. In other words, it is preferred that the oligomer has a hydroxy group originating from a diol at both ends. If, e.g., A represents the dicarboxylic acid without the two COOH groups and B represents the diol without the two OH groups, the oligomer may in particular have the following formulae:

HO—B—OC(═O)-A-C(═O)O—B—OC(═O)-A-C(═O)O—B—OH,

HO—B—OC(═O)-A-C(═O)O—B—OC(═O)-A-C(═O)O—B—OC(═O)-A-C(═O)O—B—OH,

HO—B—OC(═O)-A-C(═O)O—B—OC(═O)-A-C(═O)O—B—OC(═O)-A-C(═O)O—B—OC(═O)-A-C(═O)O—B—OH,

HO—B—OC(═O)-A-C(═O)O—B—OC(═O)-A-C(═O)O—B—OC(═O)-A-C(═O)O—B—OC(═O)-A-C(═O)O—B—OC(═O)-A-C(═O)O—B—OH,

HO—B—OC(═O)-A-C(═O)O—B—OC(═O)-A-C(═O)O—B—OC(═O)-A-C(═O)O—B—OC(═O)-A-C(═O)O—B—OC(═O)-A-C(═O)O—B—OH,

HO—B—OC(═O)-A-C(═O)O—B—OC(═O)-A-C(═O)O—B—OC(═O)-A-C(═O)O—B—OC(═O)-A-C(═O)O—B—OC(═O)-A-C(═O)O—B—OC(═O)-A-C(═O)O—B—OH,

HO—B—OC(═O)-A-C(═O)O—B—OC(═O)-A-C(═O)O—B—OC(═O)-A-C(═O)O—B—OC(═O)-A-C(═O)O—B—OC(═O)-A-C(═O)O—B—OC(═O)-A-C(═O)O—B—OC(═O)-A-C(═O)O—B—OH,

HO—B—OC(═O)-A-C(═O)O—B—OC(═O)-A-C(═O)O—B—OC(═O)-A-C(═O)O—B—OC (=O)-A-C(=O)O—B—OC(=O)-A-C(=O)O—B—OC(=O)-A-C(=O)O—B—OC(=O)-A-C(=O)O—B—OH, and HO—B—OC(=O)-A-C(=O)O—B—OC(=O)-A-C(=O)O—B—OC(=O)-A-C(=O)O—B—OC(=O)-A-C(=O)O—B—OC(=O)-A-C(=O)O—B—OC(=O)-A-C(=O)O—B—OC(=O)-A-C(=O)O—B—OC(=O)-A-C(=O)O—B—OC(=O)-A-C(=O)O—B—OH.

Here, A preferably is an aromatic group, wherein the aromatic group preferably contains up to 30 carbon atoms as well as optionally up to 10 heteroatoms selected from N, O and S, wherein the aromatic group more preferably contains up to 12 carbon atoms and optionally up to 4 heteroatoms selected from N, O, and S, wherein the aromatic groups even more preferably are phenylene or naphthylene, and B preferably is $C_{1-6}$ alkylene, wherein the $C_{1-6}$ alkylene groups are independently optionally substituted with one or more fluorine atoms.

Here, it is preferred that all groups A contained in one molecule of the oligomer are the same and that all groups B contained in one molecule of the oligomer are the same.

In a further embodiment, the invention relates to an impregnating formulation comprising:

(I) water, (II) an aromatic dicarboxylic acid, the carboxylic acid groups of which are each esterified with a diol, (III) one or more silicones, preferably comprising one or more polydimethyl siloxanes, and (IV) one or more waxes, preferably comprising one or more microcrystalline paraffins.

This impregnating formulation may, e.g., be used for the application of the impregnating composition in a process according to the invention described herein.

In a further embodiment, the invention relates to a process for producing a coated microfibrous web, the process comprising the following steps:

(a) providing a microfibrous web;

(b) impregnating the microfibrous web with an impregnating formulation as defined herein;

(c) drying the impregnated microfibrous web;

(d) applying a coating composition comprising polyurethane on only one side of the dried impregnated microfibrous web; and (e) optionally, thermal treatment of the coated microfibrous web obtained in step (d).

Another object of the invention is the use of the coated microfibrous web according to the invention as a cover of a radiation protection material, wherein the coated microfibrous web is applied on at least one side of the radiation protection material and wherein the side coated with polyurethane is adjacent to the radiation protection material.

In another embodiment of the invention, a radiation protection device is claimed which comprises (α) a radiation protection material; and (β) a coated microfibrous web according to the invention, wherein the coated microfibrous web is applied on at least one side of the radiation protection material and wherein the side coated with polyurethane is adjacent to the radiation protection material.

COATED MICROFIBROUS WEB

Figure 1:
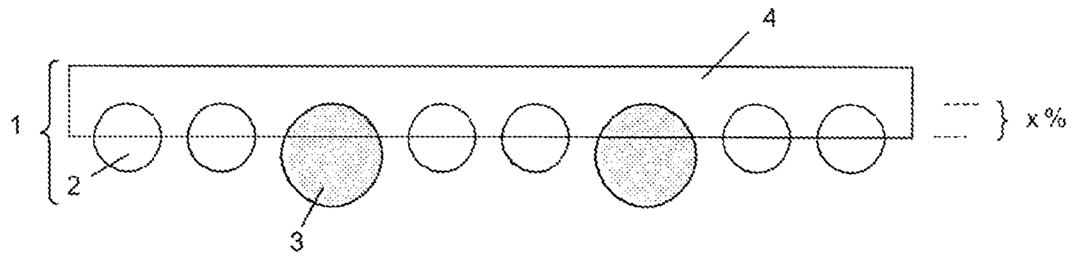
FIG. 1 shows a schematic view of a cross-section of the coated microfibrous web according to the invention.

The present invention relates to a coated microfibrous web comprising:

(i) a microfibrous web comprising one or more polyesters and/or one or more polyamides and/or one or more polyamide-polyester copolymers and impregnated with an impregnating composition comprising an aromatic dicarboxylic acid, the carboxylic acid groups of which are each esterified with a diol; and (ii) a layer comprising polyurethane which is present on only one side of the microfibrous web.

(i-a) the Microfibrous Web

The microfibrous web is not particularly limited. It may be any planar structure, such as woven fabric, fabric, knitted fabric, membrane or non-woven fabric, containing microfibers. Woven fabrics are preferred.

Microfibers are fibers which preferably have a fiber thickness of about 0.5 dtex to about 1.5 dtex, more preferably about 0.3 dtex to about 1.0 dtex. The fiber thickness is preferably measured in accordance with DIN EN ISO 137:2016.

The microfibers comprise one or more polyesters and/or one or more polyamides and/or one or more polyamide-polyester copolymers. The total content of the one or more polyester(s) and/or one or more polyamide(s) and/or one or more polyamide-polyester copolymer(s) in the microfibers is preferably 50% by weight or more, based on the total weight of the microfibers in the uncoated microfibrous web. Moreover, the microfibers may contain any other compounds, such as, e.g., cellulose (e.g., acetate or viscose) and polytetrafluoroethylene as well as mixtures thereof. Microfibers comprising at least 60% by weight or more, preferably 70% by weight or more, more preferably 80% by weight or more, even more preferably 90% by weight or more or even 95% by weight or more polyester and/or polyamide are particularly suitable. In particular, microfibers comprising at least 60% by weight or more, preferably 70% by weight or more, more preferably 80% by weight or more, even more preferably 90% by weight or more or even 95% by weight or more polyester are particularly suitable.

The term "polyester" preferably relates to compounds containing more than 20 ester groups (i.e., —C(=O)—O— groups). More preferably, the term "polyester" relates to compounds containing more than 50, preferably more than 100, more preferably more than 500 ester groups (i.e., —C(=O)—O— groups).

The term "polyamide" preferably relates to compounds containing more than 20 amide groups (e.g., —C(=O)—NH— groups). More preferably, the term "polyamide" relates to compounds containing more than 50, preferably more than 100, more preferably more than 500 amide groups (e.g., —C(=O)—NH— groups).

The term "polyamide-polyester copolymer" preferably relates to compounds containing more than 20 amide groups (e.g., —C(=O)—NH— groups) and ester groups (i.e., —C(=O)—O— groups) in total. More preferably, the term "polyamide-polyester copolymer" relates to compounds containing more than 50, preferably more than 100, more preferably more than 500 amide groups (e.g., —C(=O)—NH— groups) and ester groups (i.e., —C(=O)—O— groups) in total.

The number of amide groups (e.g., —C(=O)—NH— groups) and ester groups (i.e., —C(=O)—O— groups) in one molecule may in particular be determined by means of HPLC, e.g., RE-HPLC. Such a process has, e.g., been described in Journal of Chromatography A, volume 1097, editions 1-2, 2005, pages 130-137 by Nasser et al.

Polyesters may typically be obtained from (i) one or more hydroxy carboxylic acids, and/or (ii) one or more combinations of dialcohols with dicarboxylic acids. In this context, the acids may alternatively be used as esters.

Anhydrides of the dicarboxylic acids, such as phthalic acid anhydride, tetrahydrophthalic acid anhydride or the like may also be used.

The hydroxy carboxylic acids, dialcohols and dicarboxylic acids of the desired polyesters may, e.g., be aliphatic, cycloaliphatic, aromatic or a combination thereof.

Polyesters of dialcohols with diacids in particular include polymers of one or more dicarboxylic acids with 4 to 15 carbon atoms in total, such as succinic acid, glutaric acid, adipinic acid, pimelic acid, suberic acid, azelaic acid, sebacic acid, dodecane dioic acid, isophthalic acid, terephthalic acid, and cyclohexane dicarboxylic acid with one or more dialcohols, which exhibit 2 to 12 carbon atoms in total, such as ethylene glycol, diethylene glycol, triethylene glycol, 1,2-propane diol, 1,3-propane diol, 1,3-butane diol, 1,4-butane diol, 1,5-pentane diol, 2-methyl-2,4-pentane diol, 1,6-hexane diol, 2,2-dimethyl-1,3-propane diol (neopentyl glycol), 1,4-cyclohexane dimethanol, decamethylene glycol, and dodecamethylene glycol.

1,4-Butane diol, neopentyl glycol, ethylene glycol and mixtures thereof are commonly preferred as diols.

Polyamides which may be used in the present application are, for example, polyamides with an aliphatic semicrystalline or semiaromatic as well as amorphous structure of any kind and their blends, including polyether amides such as polyether block amides. Such polyamides are, e.g., disclosed in WO 2011/000772 A1.

Preferred polyamides are polyhexamethylene adipic acid amide (PA 66) and polyhexamethylene sebacic acid amide (PA 610), polycaprolactam (PA 6) and polylaurinic lactam (PA 12). Copolyamides PA 6/66, in particular with a proportion of caprolactam units of 5 to 95% by weight, and copolyamides PA 6/12, in particular with 5 to 95% by weight of laurinlactam units, are also preferred. PA 6, PA 66 and copolyamides 6/66 are particularly preferred; PA 6 is more particularly preferred. Further suitable polyamides may be obtained from ω-aminoalkyl nitriles such as aminocapronitrile (PA 6) and adipodinitrile with hexamethylene diamine (PA 66) by a so-called direct polymerization in the absence of water, as is, e.g., described in DE-A 10313681, EP-A 1 198491, and EP-A 922065.

Moreover, polyamides which may, e.g., be obtained by the condensation of 1,4-diaminobutane with adipic acid under increased temperature (polyamide 46) may also be considered.

Processes for producing polyamides having this structure are, e.g., described in EP-A 38 094, EP-A 38 582 and EP-A 39 524.

Polyamides which may be obtained by the copolymerization of two or more of the aforementioned monomers or mixtures of several polyamides are also suitable, the mixing ratio being arbitrary.

Monomer units which contain both an amino group and a carboxylic acid group include in particular ε-caprolactam, ethanolactam, capryllactam, 9-aminopelargonic acid, 11-aminoundecanoic acid, and laurinlactam.

Polyamides of diamines with diacids in particular include polymers of one or more of 1,12-dodecane diamine, 1,13-diaminotridecane, diaminodicyclohexylmethane, dimethyl-diaminodicyclohexylmethane, hexamethylene diamine, m-xylylene diamine, phenylene diamine, tetramethylene diamine, and trimethylhexamethylene diamine with one or more of adipic acid, azelaic acid, decane dicarboxylic acid, isophthalic acid, sebacic acid, terephthalic acid, and undecane dicarboxylic acid.

Examples of preferred polyamides include PA 46, PA 66, PA 69, PA 610, PA 612, PA 613, PA 1212, PA 1313, PA 6T, PA MXD6, PA 61, PA 6-3-T, PA 6/6T, PA 6/66, PA 6/12, PA 66/6/610, PA 6I/6T, PA PACM, PA 6I/6T/PACM, PA 12/MACMI, PA 12/MACMT, and PA PDA-T.

These polyamides and their production are known, e.g., from Ullmann's Encyclopedia of Technical Chemistry, 4$^{th}$ edition, vol. 19, p. 39-54, publishing house Chemie, Weinheim 1980; Ullmann's Encyclopedia of Industrial Chemistry, vol. A21, p. 179-206, publishing house VCH, Weinheim 1992; Stoeckhert, Kunststofflexikon (encyclopedia of plastics), 8$^{th}$ edition, p. 425-428, publishing house Carl Hanser Munich 1992 (keyword "polyamides" et seqq.) as well as Saechtling, Kunststoff-Taschenbuch (plastics paperback), 27$^{th}$ edition, publishing house Carl Hanser Munich 1998, pages 465-478. The polyamides are preferably produced in a common manner by a hydrolytic or activated anionic polymerization of the monomers in discontinuously or continuously operating apparatuses, e.g., autoclaves and VK tubes. The residual content of monomers and/or oligomers may optionally be removed by vacuum distillation of the polyamide melt or by extraction of the granules obtained from the polyamide melt, e.g., with hot water.

The microfibrous web may contain electrically conductive fibers in order to reduce electrostatic charges. The electrically conductive fibers are not particularly limited. Examples thereof are carbon fibers, metal fibers or polymer-based fibers, e.g., polymer fibers containing carbon or metal particles. In a preferred embodiment, polymer fibers containing carbon particles are used. The electrically conductive fibers have, e.g., a fiber thickness in the range of about 1 dtex to about 3 dtex, preferably about 1.2 dtex to about 2 dtex. If the diameter of the electrically conductive fibers is larger (preferably about 1.2 to about 3 times larger, more preferably about 1.2 to about 2 times larger) than the diameter of the microfibers, the electrically conductive fibers protrude from the surface of the woven fabric. The skilled person can suitably select the amount of electrically conductive fibers based on his technical knowledge. Usually, about 0.1% by weight to about 10% by weight, preferably about 0.5% by weight to about 3% by weight of electrically conductive fibers will be contained in the microfibrous web, the weight percentage relating to the total weight of the fibers in the uncoated microfibrous web. In a preferred embodiment, the finished microfibrous web should have an electrostatic surface resistance of about $10^5$ ohm to about $10^8$ ohm (measured in accordance with DIN 100015-1 at 25% relative humidity and 23° C.).

Microfibers and the electrically conductive fibers which are optionally present are processed into a microfibrous web in accordance with known processes. The electrically conductive fibers may be incorporated into the microfibrous web randomly or in a regular arrangement. The type of incorporation will depend on the requirements of discharge of electrical charges as well as on the process by means of which the microfibrous web is produced. In a preferred embodiment, the electrically conductive fibers are incorporated in a regular arrangement.

They may, e.g., be incorporated in a lattice design, since this configuration particularly favourably discharges possible electrostatic charges. The distances between the lattice lines are preferably within the range of about 3 mm to about 100 mm, preferably about 5 mm to about 75 mm, wherein the side lengths of the lattice rectangles may differ from each other.

The air permeability of the microfibrous web used as the starting material is selected by the skilled person depending on its intended use. In one embodiment, the air permeability is from 0 to about 100 l/min per $dm^2$, preferably from 5 to about 50 l/min per $dm^2$, the air permeability being measured in accordance with DIN EN ISO 9237.

The weight per unit area of the microfibrous web used as a starting material is also selected in a suitable manner depending on its intended use. The weight per unit area will usually be within the range of from about 50 $g/cm^2$ to about 200 $g/m^2$, preferably from about 60 $g/m^2$ to about 150 $g/m^2$.

The thickness of the microfibrous web used as a starting material is not particularly limited. It will usually be selected depending on the intended use. In one embodiment, the microfibrous web will have a thickness in the range of from about 0.05 mm to about 0.20 mm, preferably from about 0.10 mm to about 0.15 mm.

(i-b) The Impregnating Composition or Impregnating Formulation

Herein, the impregnating composition is usually understood to be the components of the impregnating formulation which are non-volatile under drying conditions. In other words, the term "impregnating formulation" is used for the composition in which the impregnation is applied, while the term "impregnating composition" means the composition in which the impregnation is present upon drying. Consequently, the indications made herein as regards the ingredients of the impregnating composition also apply to the ingredients of the impregnating formulation and vice versa (apart from water or other solvents which may be contained in the impregnating formulation).

Depending on the type of application, e.g., if the impregnating composition is applied without adding water or other solvents, the terms impregnating formulation and impregnating composition may, however, also be used synonymously.

Aromatic Dicarboxylic Acid, the Carboxylic Acid Groups of which are Each Esterified with a Diol The impregnating composition used in the present invention comprises at least one aromatic dicarboxylic acid, the carboxylic acid groups of which are each esterified with a diol. The inventors have surprisingly found that such a compound is particularly suited to transport further components of the impregnating composition, such as waxes and silicones, into the coating film. Due to this compound's interacting in the intermediate layer, sufficient adhesion between the microfibrous web and the layer comprising polyurethane may take place. Otherwise, the layer comprising polyurethane may be removed again relatively easily.

It is assumed that the aromatic dicarboxylic acid, the carboxylic acid groups of which are each esterified with a diol acts as a release film during the knife coating process and during drying almost completely diffuses into both the microfibrous web but also into the layer comprising polyurethane. Here, the aromatic dicarboxylic acid, the carboxylic acid groups of which are each esterified with a diol, inter alia acts as a transporting substance of the wax and the silicone.

Alternatively, the aromatic dicarboxylic acid, the carboxylic acid groups of which are each esterified with a diol, may also referred to as a dicarboxylic acid-bis(diol)-ester. In general, this term refers to a compound which is obtained by the condensation (cleavage of water) of one molecule of aromatic dicarboxylic acid with two molecules of diol.

In general, aromatic dicarboxylic acids are made up of an aromatic group as well as two —COOH groups attached thereto. Apart therefrom, the aromatic group may also have one more more further substituents such as —OH, —$C_{1-6}$ alkyl, —F, —Cl, —Br, —CN, $NO_2$, etc. The aromatic group may be a carbocyclic or heterocyclic group and may, e.g., contain 1, 2 or 3 rings which are usually fused. Examples of aromatic groups comprise benzene, naphthalene, thiophene, furane, pyrrole, imidazole, pyrazole, thiazole, isothiazole, oxazole, isoxazole, pyridine, pyrazine, pyrimidine, pyridazine, 1,2,4-oxadiazole, 1,3,4-oxadiazole, 1,2,4-thiadiazole, 1,3,4-thiadiazole, furazane, benzofurane, benzimidazole, benzoxazole, benzothiazole, benzisothiazole, naphtho[2,3-b]thiophene, isoquinoline, quinoline, indole, quinoxaline, phenanthridine, phenothiadine, phenoxazine, phthalazine, naphthyridine, quinazoline, cinnoline, carbazole, phenazine, phthalimide, and thioxanthene.

Preferred examples of aromatic dicarboxylic acids comprise phthalic acid, isophthalic acid, terephthalic acid, 2,6-naphthalene dicarboxylic acid, and 1,4-naphthalene dicarboxylic acid.

The diols are preferably aliphatic diols. These are preferably selected from straight-chain, branched or cyclic alkane diols with 2 to 15 carbon atoms. Straight-chain alkane diols with 2 to 10 carbon atoms, preferably 2 to 5 carbon atoms, more preferably 2 or 3 carbon atoms, are more preferred. In the straight-chain alkane diols, the two hydroxy groups are preferably terminal (e.g., α-ω-dihydroxy alkanes).

The aromatic dicarboxylic acid, the carboxylic acid groups of which are each esterified with a diol, is preferably a compound of formula (I):

HO—($C_{1-6}$alkylene)-O—C(O)-(aromatic group)-C(O)—O—($C_{1-6}$ alkylene)-OH (I)

wherein the $C_{1-6}$ alkylene groups may be straight-chain or branched and are independently optionally substituted with one or more fluorine atoms and the aromatic group preferably contains up to 30 carbon atoms as well as optionally up to 10 hetero atoms, selected from N, O, and S.

The aromatic group preferably contains one, two or three fused rings. The aromatic group preferably contains up to 12 carbon atoms and optionally up to 4 heteroatoms, selected from N, O, and S. Preferably, the aromatic group is phenylene or naphthylene.

The compound of formula (I) preferably is a compound of the following formula (II):

(II)

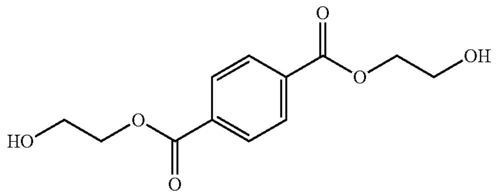

In a further embodiment, the compound of formula (I) preferably is a compound of the following formula (III):

(III)

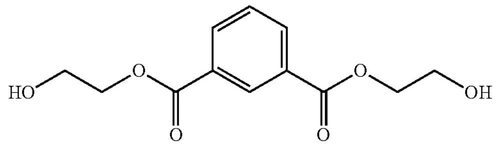

Apart from the aromatic dicarboxylic acid, the carboxylic acid groups of which are each esterified with a diol, the impregnating composition preferably further comprises one or more selected from:

a) one or more silicone(s), and b) one or more wax(es).

In this context, the impregnating composition preferably comprises both one or more polydimethyl siloxanes and one or more waxes.

Silicones

Any polymers (in particular compounds having a $M_w$ of 200 or more) containing at least one C—H bond as well as one Si—O—Si group are understood to be silicones.

Preferred silicones are represented by the following formula:

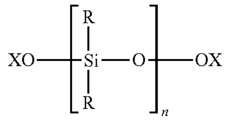

wherein n is in the range of from 5 to 100000 (preferably 30 to 10000, more preferably 50 to 1000, even more preferably 90 to 500), each R is the same or different (preferably the same) and is selected from $C_{1-20}$ alkyl or $C_{1-20}$ aryl groups (preferably $C_{1-5}$ alkyl groups, more preferably methyl groups), X is the same or different and represents hydrogen or a group selected from polyether, polyester, alkyl, alkylaryl, aryl, epoxy, acryl or vinyl groups, wherein each X preferably is hydrogen.

The one or more silicones preferably comprise one or more polydimethyl siloxanes. Polydimethyl siloxanes are commercially available as so-called dimethicones.

Particularly suitable for use in the present invention are PDMS emulsions with terminal OH groups and use concentrations of from 2% to 40% of the PDMS portion, such as Korasilon® oils R by Kurt Obermaier GmbH & Co. KG.

Waxes

The one or more waxes are not particularly limited and may be of any known kind. The one or more waxes preferably exhibit a melting temperature which is 20 to 30° C. below the maximum drying temperature in the subsequent drying step. In the present invention, the melting points are determined in accordance with DIN EN ISO 1357-2.

The one or more waxes preferably have a solidification point in accordance with ASTM D938 of from +40° C. to +160° C., preferably from +45° C. to +80° C. The one or more waxes preferably comprise beeswax or consist of beeswax.

For example, the waxes may comprise fatty acid triglycerides or paraffins, or may consist of the latter.

Fatty acid triglycerides as waxes preferably contain fatty acids with 22 or more carbon atoms, such as triglycerides of docosaic acid, tricosaid acid, tetracosaic acid, pentacosaic acid, hexacosaic acid, heptacosaic acid or mixtures thereof. Examples of such waxes are beeswax, carnauba wax, candelilla wax, and montan wax.

Beeswax emulsions which may be used as a wax component in the present invention are, inter alia, available as Aquacer 561 by BYKChemie GmbH. These preferably exhibit use concentrations of from 5 to 70% by weight, more preferably from 15 to 40% by weight (weight of the wax per weight of the emulsion).

Preferably, the waxes comprise one or more paraffins, preferably up to 50% by weight or more, based on the total waxes (more preferably, up to 80% by weight or more, or even up to 95% or more). Paraffins are saturated hydrocarbons which may be straight-chain or branched and usually contain from 15 to 80 carbon atoms (preferably from 35 to 80, more preferably from 40 to 70) per molecule. These are usually solid at 25° C.

The one or more paraffins preferably comprise one or more microcrystalline paraffins. It is preferred that the one or more waxes are microcrystalline paraffin.

Paraffins containing from 35 to 80 carbon atoms (preferably from 40 to 70 carbon atoms) per molecule and preferably having a melting point of from 70 to 80° C. are usually referred to as microcrystalline paraffins. Microcrystalline paraffins usually contain a high amount of iso-alkanes. In the food sector, microcrystalline paraffin is also referred to as E 905.

The impregnating composition is usually applied in the form of a solution or dispersion of its components in a suitable solvent. In case of the application as a solution, the solvent usually contains an organic solvent, such as benzene, toluene, xylene, hexane, and halogenated hydrocarbons.

However, it is preferred that the impregnating composition is used in the form of an aqueous dispersion. Herein, such a dispersion may also be referred to as an impregnating formulation. In this context, a common impregnating formulation usually contains from about 20 to 98% by weight of water, the remainder being composed of the components of the impregnating composition. The water used in this context preferably is deionized water consisting of at least 99.9% by weight of $H_2O$ and $D_2O$.

A preferred impregnating formulation which is also claimed herein as such comprises:

(I) water, (II) an aromatic dicarboxylic acid, the carboxylic acid groups of which are each esterified with a diol, (III) one or more silicones, and (IV) one or more waxes.

More preferably, the impregnating formulation comprises:

(I) 20-98% by weight of water, (II) 0.5-30% by weight of an aromatic dicarboxylic acid, the carboxylic acid groups of which are each esterified with a diol, (III) 1-30% by weight of one or more silicones, and (IV) 5-80% by weight of one or more waxes.

Even more preferably, the impregnating formulation comprises:

(I) 50-97% by weight of water, (II) 2-15% by weight of an aromatic dicarboxylic acid, the carboxylic acid groups of which are each esterified with a diol, (III) 4-10% by weight of one or more silicones, and
(IV) 5-12% by weight of one or more waxes.

Still more preferably, the impregnating formulation comprises:
(I) 60-95% by weight of water,
(II) 3-5% by weight of an aromatic dicarboxylic acid, the carboxylic acid groups of which are each esterified with a diol,
(III) 5-8% by weight of one or more silicones, and
(IV) 6-10% by weight of one or more waxes.

It is understood that one ore more of the components of the impregnating formulation may also be used in the form of a solution, emulsion, suspension or dispersion in a suitable solvent. In the calculation of the total water content, the water used in such solutions, emulsions, suspensions or dispersions is to be added to the other water used in order to obtain the given water content of the impregnating formulation. Thus, if, e.g., a water content of 20-95% by weight is given for the impregnating formulation, this value comprises the water in total, also water which is optionally introduced into the impregnating formulation by solutions, emulsions, suspensions or dispersions of aromatic dicarboxylic acid, silicones, waxes etc.

Consequently, the impregnating formulation preferably comprises 20-98% by weight of water, more preferably 50-97% by weight of water, even more preferably 60-95% by weight of water, still more preferably 70-85% by weight of water, based on the total weight of the impregnating formulation.

Furthermore, the impregnating formulation preferably comprises 0.5-30% by weight of an aromatic dicarboxylic acid, the carboxylic acid groups of which are each esterified with a diol, more preferably 2-15% by weight of an aromatic dicarboxylic acid, the carboxylic acid groups of which are each esterified with a diol, even more preferably 2-7% by weight of an aromatic dicarboxylic acid, the carboxylic acid groups of which are each esterified with a diol, still more preferably 3-5% by weight of an aromatic dicarboxylic acid, the carboxylic acid groups of which are each esterified with a diol, based on the total weight of the impregnating formulation.

Furthermore, the impregnating formulation preferably comprises 1-30% by weight of one or more silicones, more preferably 4-10% by weight of one or more silicones, even more preferably 5-8% by weight of one or more silicones, still more preferably 6-7% by weight of one or more silicones, based on the total weight of the impregnating formulation.

Furthermore, the impregnating formulation preferably comprises 5-80% by weight of one or more waxes, more preferably 5-20% by weight of one or more waxes, even more preferably 6-10% by weight of one or more waxes, still more preferably 7-9% by weight of one or more waxes, based on the total weight of the impregnating formulation.

Furthermore, the impregnating formulation preferably comprises 1-10% by weight of one or more emulsifiers, more preferably 2-7% by weight of one or more emulsifiers, even more preferably 3-6% by weight of one or more emulsifiers, still more preferably 4-5% by weight of one or more emulsifiers, based on the total weight of the impregnating formulation.

It is understood that the impregnating composition or impregnating formulation may further contain adjuvants, such as further silicones, silanes, further waxes, crosslinking agents (for example isocyanate crosslinking agents, e.g. SCL (Kapp-Chemie), acetoxy-, alkoxy-, ketoxime silanes (CAS no.: 1185-55-3)), salts (for example zirconium salts), emulsifiers, dispersants, preservatives, deaerating agents, defoaming agents, rheological additives, slip additives, softeners and/or matting agents etc., if required.

It is understood that in view of the components of the impregnating formulation given above, the impregnating composition preferably comprises:
(I) 5% by weight or less of water,
(II) 9-35% by weight of an aromatic dicarboxylic acid, the carboxylic acid groups of which are each esterified with a diol,
(III) 14-57% by weight of one or more silicones, and
(IV) 15-70% by weight of one or more waxes.

More preferably:
(I) 3% by weight or less of water,
(II) 12-26% by weight of an aromatic dicarboxylic acid, the carboxylic acid groups of which are each esterified with a diol,
(III) 19-43% by weight of one or more silicones, and
(IV) 23-51% by weight of one or more waxes.

Even more preferably:
(I) 2% by weight or less of water,
(II) 14-22% by weight of an aromatic dicarboxylic acid, the carboxylic acid groups of which are each esterified with a diol,
(III) 23-36% by weight of one or more silicones, and
(IV) 27-43% by weight of one or more waxes.

Consequently, the impregnating composition preferably comprises 5% or less of water, more preferably 3% by weight or less of water, even more preferably 2% by weight or less of water, still more preferably 1% by weight or less of water, based on the total weight of the impregnating composition.

Furthermore, the impregnating composition preferably comprises 9-35% by weight of an aromatic dicarboxylic acid, the carboxylic acid groups of which are each esterified with a diol, more preferably 12-26% by weight of an aromatic dicarboxylic acid, the carboxylic acid groups of which are each esterified with a diol, even more preferably 14-22% by weight of an aromatic dicarboxylic acid, the carboxylic acid groups of which are each esterified with a diol, still more preferably 16-19% by weight of an aromatic dicarboxylic acid, the carboxylic acid groups of which are each esterified with a diol, based on the total weight of the impregnating composition.

Furthermore, the impregnating composition preferably comprises 14-57% by weight of one or more silicones, more preferably 19-43% by weight of one or more silicones, even more preferably 23-36% by weight of one or more silicones, still more preferably 26-31% by weight of one or more silicones, based on the total weight of the impregnating composition.

Furthermore, the impregnating composition preferably comprises 15-70% by weight of one or more waxes, more preferably 23-51% by weight of one or more waxes, even more preferably 27-43% by weight of one or more waxes, still more preferably 31-38% by weight of one or more waxes, based on the total weight of the impregnating composition.

Furthermore, the impregnating composition preferably comprises 10-39% by weight of one or more emulsifiers, more preferably 13-30% by weight of one or more emulsifiers, even more preferably 16-25% by weight of one or more emulsifiers, still more preferably 18-22% by weight of one or more emulsifiers, based on the total weight of the impregnating composition.

(ii) The Layer Comprising Polyurethane

A layer comprising polyurethane is applied on one side of the microfibrous web. Due to the layer comprising polyurethane the coated microfibrous web can be cleaned easily. Moreover, this layer guarantees impermeability towards water and penetration by microorganisms, such as bacteria. The layer comprising polyurethane is preferably applied on a surface of the microfibrous web in the form of a continuous layer. The layer should have a uniform thickness. The thickness of the layer is preferably within the range of about 3 $g/m^2$ to about 50 $g/m^2$, more preferably within the range of about 8 $g/m^2$ to about 20 $g/m^2$.

All polyurethane homo- and copolymers may be used as polyurethanes. Inter alia, polyurethane block copolymers such as polyester polyurethanes and polyether polyol polyurethanes may be used. The polyester and polyether polyols usually have a molecular weight ($M_w$ as determined by Static Light Scattering, in particular Right angle light scattering (RALS)) of about 4000 to about 6000. An example of a commercially available product is Impranil®.

Apart from polyurethane, the layer comprising polyurethane may also contain further components. A possible component is a fluororesin.

The fluororesin may be a partially fluorinated or perfluorinated polymer. Both homo- and copolymers are suitable. Fluoroalkylacrylate homopolymers and fluoroalkylacrylate copolymers are particularly suitable.

Preferred fluororesins exhibit perfluoroalkyl containing side groups. These side groups may, for example, be introduced into the fluororesin by polymerizing perfluoroalkyl-containing monomers having the following structure:

Perfluoroalkyl unit-optional spacer-polymerizable group

The perfluoroalkyl unit preferably comprises from about 4 to about 12 carbon atoms. The optional spacer is not particularly limited, with the proviso that it is not a perfluoroalkyl unit. It preferably comprises from about 2 to about 10 atoms, more preferably about 2 to about 8 atoms, in the chain. Both carbon atoms and heteroatoms such as N, O, and S may be present in the spacer. The polymerizable group is not particularly limited and may be any polymerizable group suitable for forming a polymer. Examples of polymerizable groups comprise ethylenically unsaturated groups.

Examples of perfluoroalkyl-containing monomers are perfluoroalkyl-containing acrylates of the formula $$H_2C{=}CR{-}C(O){-}O{-}(CH_2)_n{-}C_mF_{2m+1}.$$

wherein

R represents H oder $CH_3$, n is 0 to about 8, preferably 0 to about 6; and m is about 4 to about 12.

The fluororesins may have further side groups, alkyl-containing side groups and/or functional side groups being particularly suitable. In one embodiment, the fluororesin may have alkyl-containing side groups.

These side groups may, for example, be introduced into the fluororesin by polymerizing alkyl-containing monomers having the following structure:

Alkyl unit-optional spacer-polymerizable group

The alkyl unit preferably comprises from about 1 to about 12 carbon atoms. The optional spacer is not particularly limited, with the proviso that it is not an alkyl unit. It preferably comprises about 0 to about 20 atoms, more preferably about 0 to about 10 atoms, in the chain. Both carbon atoms and heteroatoms such as N, O, and S may be present in the spacer. The polymerizable group is not particularly limited and may be any polymerizable group suitable for forming a polymer. Examples of polymerizable groups include ethylenically unsaturated groups.

Examples of alkyl-containing monomers are alkyl-containing acrylates of the formula $$H_2C{=}CR{-}C(O){-}O{-}C_pH_{2p+1}$$

wherein

R represents H or $CH_3$; and p is about 1 to about 12.

In one embodiment, the fluororesin may have functional side groups.

These side groups may for example be introduced into the fluororesin by polymerizing functional monomers having the following structure:

Functional unit-optional spacer-polymerizable group

The functional unit is not particularly limited and may contain any functional group. Examples of functional groups are OH, SH, $NH_2$, N-methylolsulfonamides etc. The functional unit preferably comprises from 0 to about 20 carbon atoms, preferably from 0 to about 12 carbon atoms. The optional spacer is not particularly limited, with the proviso that it is not an alkyl unit. It preferably comprises about 0 to about 20 atoms, more preferably 0 to about 10 atoms, in the chain. Both carbon atoms and heteroatoms such as N, O, and S may be present in the spacer. The polymerizable group is not particularly limited and may be any polymerizable group suitable for forming a polymer. Examples of polymerizable groups include ethylenically unsaturated groups.

Examples of functional monomers are acrylates of the formula $$H_2C{=}CR{-}C(O){-}O{-}C_pH_{2p}X$$

wherein

R represents H or $CH_3$;

p is about 1 to about 12; and

X represents a functional group selected from OH, SH, $NH_2$, and N-methylolsulfonamides.

Examples of commercially available fluororesins comprise Evoral®, Oleophobol, Scotchguard, Tubiguard, Repellan, Ruco-Guard, Unidyne, Quecophob and Nuva, but are not limited to the latter.

In case the fluororesin is used, it is preferably contained in the layer in an amount of from 0 to about 10 parts by weight, more preferably about 0.5 parts by weight to about 3 parts by weight, based on 100 parts by weight of polyurethane. Due to environmentally relevant considerations which have arisen in the past years, however, it is preferred that the layer comprising polyurethane does not comprise any fluororesin.

The layer comprising polyurethane may contain further adjuvants. An optional adjuvant is silicon dioxide. The sterilizability with gases such as ethylene oxide is improved by the addition of silicon dioxide. Silicon dioxide is preferably used in the form of silicic acid in the layer. The size of the silicon dioxide particles is usually within the range of about 0.2 μm to about 10 μm, preferably about 0.2 μm to about 5 μm. Silicon dioxide is preferably contained in the layer in an amount of 0 to about 10 parts by weight, more preferably about 1 part by weight to about 5 parts by weight, based on 100 parts by weight of polyurethane.

Moreover, the layer comprising polyurethane may also comprise titanium dioxide. Titanium dioxide serves as a matting agent. The size of the titanium dioxide particles is usually within the range of about 0.2 μm to about 10 μm, preferably about 0.2 μm to about 5 μm. Titanium dioxide is preferably contained in the layer in an amount of 0 to about 5 parts by weight, more preferably about 0.2 parts by weight to about 2 parts by weight, based on 100 parts by weight of polyurethane.

Moreover, the layer comprising polyurethane may contain further additives such as deaerating agents, fungicides, additives for increasing scratch resistance, water repellents, thickeners, rheological additives, flow improvers etc. These additives are either additives for the production of the layer or improve the properties of the finished layer. The person skilled in the art is able to select them in a suitable manner based on his technical knowledge. The additives are preferably contained in the layer in an amount of 0 to about 20 parts by weight, more preferably about 0.5 parts by weight to about 10 parts by weight, based on 100 parts by weight of polyurethane.

Processes for Producing the Coated Microfibrous Web

The coated microfibrous web according to the invention may be produced using various processes. A preferred process will be described in the following.

(a) Provision of a Microfibrous Web

First, a microfibrous web is provided. The microfibrous web used as a starting material has been described in detail above.

The microfibrous web may be used as such in the process according to the invention. If desired, however, it may be subjected to a pretreatment, e.g., to increase hydrophilicity. The pretreatment, e.g., to increase hydrophilicity, may be carried out in accordance with processes known in the art. Nonionic surface active agents, fatty acid condensates, silicones and mixtures thereof may be used as means to increase hydrophilicity.

The means to increase hydrophilicity are applied onto the microfibrous web. The application process is not particularly limited. In one embodiment, the microfibrous web is brought into contact with a solution or dispersion of the means to increase hydrophilicity (for example by spraying, submerging, etc.).

After applying the means to increase hydrophilicity, the resulting microfibrous web is preferably dried. The specific drying conditions depend on the means used to increase hydrophilicity. Usually, a drying temperature of about 40° C. to about 80° C., preferably of about 50° C. to about 60° C., is selected. The drying time is usually about 30 s to about 240 s, preferably about 60 s to about 120 s.

It is desirable if the microfibrous web prior to the impregnation step exhibits a liquor pick-up for the impregnating composition of about 65% by weight to about 85% by weight, more preferably about 65% by weight to about 70% by weight, based on the dry weight of the optionally pretreated microfibrous web.

(b) Impregnating the Microfibrous Web with an Impregnating Composition

The microfibrous web is impregnated with an impregnating composition comprising an aromatic dicarboxylic acid, the carboxylic acid groups of which are each esterified with a diol. Suitable aromatic dicarboxylic acids, the carboxylic acid groups of which are each esterified with a diol, are described above.

The microfibrous web is impregnated using known processes. These processes include spraying, immersion, exhaust process, slop-padding, and foam impregnation. Immersion impregnation is preferred, since the latter allows a complete impregnation of the microfibrous web.

(c) Drying of the Impregnated Microfibrous Web

After the impregnation, the impregnated microfibrous web is dried, the temperature being for example within the range of 40 to 120° C. The specific drying conditions depend on the components of the impregnating composition used. Usually, a drying temperature of about 40° C. to about 110° C., preferably of about 50° C. to about 80° C., is selected. The drying time usually is about 10 s to about 240 s, preferably about 30 s to about 120 s.

By the impregnation with the impregnating composition, the absorbing capacity of the microfibrous web is adjusted. By merely drying, it is easier to guarantee that the polyurethane coating composition does not penetrate the entire microfibrous web.

It is desirable that the microfibrous web exhibits a liquor pick-up for the coating composition of about 30% by weight to about 60% by weight, more preferably about 30% by weight to about 50% by weight, based on the dry weight of the impregnated microfibrous web, after the drying step.

(d) Application of a Coating Composition Comprising Polyurethane on Only One Side of the Dried Impregnated Microfibrous Web After the drying step, the coating composition comprising polyurethane is applied on only one side of the dried impregnated microfibrous web. The components of the layer comprising polyurethane are described in detail above.

The coating composition is preferably used in the form of a solution or dispersion of the desired components. The concentration of the polyurethane in the solution or dispersion is preferably within the range of about 50% by weight to about 80% by weight, more preferably about 60% by weight to about 80% by weight. By selecting a viscous coating composition, it is easier to guarantee that the layer comprising polyurethane is present on only one side of the finished microfibrous web.

The coating composition is applied onto the dried impregnated microfibrous web using known processes. Among these processes are roller coating, knife coating, spread coating, foam coating, transfer coating, and film coating, knife coating being preferably used.

The coating composition is applied in such a manner that the layer comprising polyurethane is present on only one side of the finished microfibrous web. FIG. 1 shows a schematic view of the cross-section of a finished coated microfibrous web according to the invention, the microfiber layer being depicted as a monolayer for the sake of simplicity.

In the shown embodiment, the microfibrous web (1) comprises microfibers (2) and electrically conductive fibers (3), in this embodiment the diameter of the electrically conductive fibers (3) being larger than the diameter of the microfibers (2). The impregnation is not shown in this illustration. The layer (4) comprising polyurethane is present on only one side of the finished microfibrous web.

It is understood that the coating composition penetrates to some extent into the microfibrous web upon application onto the dried impregnated microfibrous web. Within the scope of the invention, the layer comprising polyurethane, however, must not cover the microfibers on the side of the microfibrous web opposed to the side to which it has been applied. The degree of penetration is preferably at most about 60%, more preferably at most about 40%. The degree of penetration is preferably at least about 20%, more preferably at least about 30%. Within the scope of the invention, the penetration rate is defined as follows:

$$\text{Penetration rate} = \frac{d_1}{d_2} \times 100$$

$d_1$ thickness of the part of the microfiber layer in contact with the layer comprising polyurethane $d_2$ thickness of the entire microfiber layer The thickness values may be measured by means of optical processes such as microscopy. An example of a possible measuring method is the examination of a cross-section by means of scanning electron microscopy.

The degree of penetration is visually indicated in FIG. 1 by the right curly bracket and the term "x %". In FIG. 1, it is about 50%, since the microfibers (white spheres) are embedded to a degree of about 50% in the layer comprising polyurethane.

After the application, the coating composition may be dried in step (d). Alternatively, drying may be foregone and the coating composition may be dried during the thermal treatment in step (e).

Usually, a drying temperature of about 40° C. to about 110° C., preferably of about 80° C. to about 100° C., will be selected. The drying time is usually at about 10 s to about 240 s, preferably at about 10 s to about 120 s.

(e) Optional Thermal Treatment of the Microfibrous Web Obtained in Step (d)

In step (e), the (optionally dried) coated microfibrous web obtained in step (d) is optionally subjected to thermal treatment.

In the thermal treatment, usually a temperature of about 120° C. to about 190° C., preferably about 140° C. to about 180° C., is selected. It is of course possible to perform the thermal treatment in several steps at different temperatures. The length of the thermal treatment is usually about 10 s to about 240 s, preferably about 30 s to about 120 s.

Radiation Protection Device

The coated microfibrous web according to the invention may be used as a cover of a radiation protection material in a radiation protection device, wherein the coated microfibrous web is applied on at least one side of the radiation protection material and wherein the side coated with polyurethane is adjacent to the radiation protection material.

Figure 2:
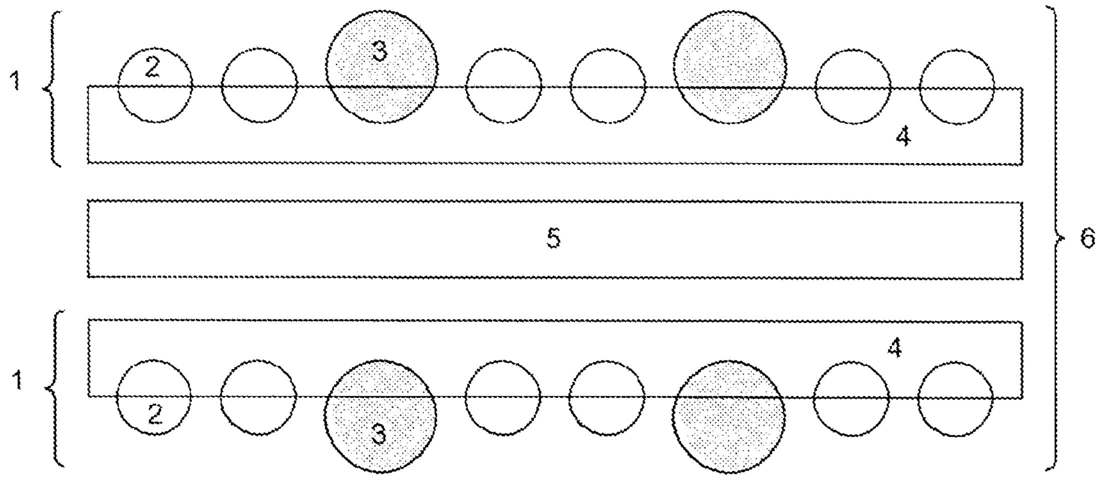
FIG. 2 shows a schematic view of a cross-section of the radiation protection device according to the invention.

FIG. 2 shows a schematic view of a cross-section of the radiation protection device (6) according to the invention. In the embodiment shown above, the microfibrous web (1) comprises microfibers (2) and electrically conductive fibers (3), in this embodiment the diameter of the electrically conductive fibers (3) being larger than the diameter of the microfibers (2). The impregnation is not shown in this figure. The layer (4) comprising polyurethane is present on only one side of the finished microfibrous web (1).

The microfibrous web (1) according to the invention is applied on both sides of the radiation protection material (5) in the embodiment shown above, the layer (4) comprising polyurethane being adjacent to the radiation protection material (5), respectively.

As radiation protection devices, all devices may be mentioned which protect individuals or objects against harmful radiation, in particular X-ray radiation, UV radiation, infrared radiation, and radioactive radiation, particularly preferably X-ray radiation. Examples include aprons, gloves, shields, curtains, coats, drapes, draping materials, eye protection products, and gowns, but are not limited thereto. Due to its flexibility and its pleasant haptic properties, the coated microfibrous web according to the invention is particularly suitable for flexible radiation protection devices and/or radiation protection device worn by individuals.

Within the scope of the invention, all kinds of radiation protection materials may be used. The type of radiation protection material will depend on the radiation to be shielded and is not particularly limited. By way of example, radiation protection material based on lead or lead oxide may be mentioned. Lead-free radiation protection material may also be used. Lead-free radiation protection material is, for example, disclosed in DE 10 2004 001 328 A, WO 2005/024846 A, WO 2005/023116 A, DE 10 2006 028 958 A, WO 2004/017332 A, and DE 10 2005 034 384. Combinations of radiation protection materials are possible as well. The radiation protection material may comprise one or several layers.

In the production of a radiation protection device, the coated microfibrous web according to the invention is applied on at least one side of the radiation protection material. Usually, the radiation protection material is enveloped by the coated microfibrous web according to the invention. The microfibrous web and the radiation protection material may be bonded to each other in a known manner, e.g., by sewing, gluing, taping, backing or laminating. If the microfibrous web and the radiation protection material are processed to form a composite, e.g., by backing or laminating, they may subsequently be processed to form finished products using manufacturing processes, such as cutting, punching, water-jet cutting, forming or laser-beam cutting.

The microfibrous web according to the invention protects the radiation protection material. In particular, the radiation protection material is protected against:

- mechanical influences;
- penetration by germs (such as bacteria, viruses and fungi);
- chemical influences, for example due to cleaning and disinfecting agents;
- action of light; and/or
- penetration by body fluids, such as blood, urine or sweat.

Due to its textile nature, the coated microfibrous web moreover imparts a pleasant surface touch to the radiation protection devices, which in particular imparts a pleasant-to-wear sensation to clothes.

In contrast to conventional radiation protection devices where a side coated with polyurethane faces away from the radiation protection material, the coated microfibrous web according to the invention is arranged in such a manner that the side coated with polyurethane is adjacent to the radiation protection material. Consequently, in the conventional arrangement, the side coated with polyurethane faces outward and is, thus, subjected to severe physical stress. This leads to increased wear and abrasion. Due to the arrangement according to the invention where the side coated with polyurethane faces inward, physical stress is significantly lower. Surprisingly, in the arrangement according to the invention, the coated microfibrous web has a high degree of cut and tear resistance, so that its performance properties are clearly superior to those of conventional materials.

The present invention may be summed up by the following items 1 to 22:

1. A coated microfibrous web comprising:
   (i) a microfibrous web comprising one or more polyesters and/or one or more polyamides and/or one or more polyamide-polyester copolymers and impregnated with an impregnating composition comprising an aromatic dicarboxylic acid, the carboxylic acid groups of which are each esterified with a diol; and
   (ii) a layer comprising polyurethane which is present on only one side of the microfibrous web.
2. The coated microfibrous web according to item 1, wherein the thickness of the layer comprising polyurethane is about 3 g/$m^2$ to about 50 g/$m^2$.
3. The coated microfibrous web according to item 1 or 2, wherein the layer comprising polyurethane furthermore comprises fluororesin in an amount of about 3 parts by weight to about 30 parts by weight, based on 100 parts by weight of polyurethane.

4. The coated microfibrous web according to any one of items 1 to 3, wherein the layer comprising polyurethane furthermore comprises silicon dioxide in an amount of about 1 part by weight to about 10 parts by weight, based on 100 parts by weight of polyurethane.
5. The coated microfibrous web according to any one of items 1 to 4, wherein the aromatic dicarboxylic acid, the carboxylic acid groups of which are each esterified with a diol, is a compound of formula (I):

$$HO—(C_{1-6}\text{-alkylene})\text{-}O—C(O)\text{-(aromatic group)-}C(O)—O—(C_{1-6}\text{-alkylene})\text{-}OH \quad (I)$$

wherein the $C_{1-6}$-alkylene groups are independently optionally substituted with one or more fluorine atoms, and the aromatic group preferably contains up to 30 carbon atoms as well as optionally up to 10 hetero atoms, selected from N, O, and S.

6. The coated microfibrous web according to item 5, wherein the $C_{1-6}$ alkylene group is not substituted with one or more fluorine atoms.
7. The coated microfibrous web according to item 5 or 6, wherein the aromatic group contains up to 12 carbon atoms and optionally up to 4 heteroatoms, selected from N, O, and S.
8. The coated microfibrous web according to any one of items 5 to 7, wherein the aromatic group is phenylene or naphthylene.
9. The coated microfibrous web according to any one of items 5 to 8, wherein the compound of formula (I) is a compound of the following formula (II):

(II)

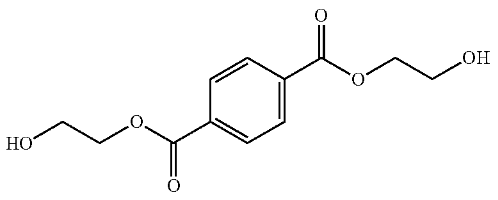

10. The coated microfibrous web according to any one of items 5 to 8, wherein the compound of formula (I) is a compound of the following formula (III):

(III)

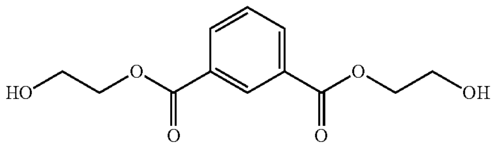

11. The coated microfibrous web according to any one of items 1 to 10, wherein the impregnating composition in addition to the aromatic dicarboxylic acid, the carboxylic acid groups of which are each esterified with a diol, further comprises one or more selected from:
   a) one or more silicones, preferably one or more polydimethylsiloxanes, and
   b) one or more waxes.
12. The coated microfibrous web according to item 11, wherein the one or more waxes comprise one or more microcrystalline paraffins.
13. The coated microfibrous web according to item 11 or 12, wherein the impregnating composition comprises both one or more polydimethyl siloxanes and one or more waxes.
14. The coated microfibrous web according to any one of items 1 to 13, wherein the microfibrous web comprises one or more polyesters.
15. An impregnating formulation, comprising:
   (I) water,
   (II) an aromatic dicarboxylic acid, the carboxylic acid groups of which are each esterified with a diol,
   (III) one or more silicones, preferably comprising one or more polydimethylsiloxanes, and
   (IV) one or more waxes, preferably comprising one or more microcrystalline paraffins.
16. A process for producing a coated microfibrous web, comprising the following steps of:
   (a) providing a microfibrous web;
   (b) impregnating the microfibrous web with an impregnating composition comprising an aromatic dicarboxylic acid, the carboxylic acid groups of which are each esterified with a diol, or with an impregnating formulation as defined in item 15;
   (c) drying the impregnated microfibrous web;
   (d) applying a coating composition comprising polyurethane on only one side of the dried impregnated microfibrous web; and
   (e) optionally, thermal treatment of the coated microfibrous web obtained in step (d).
17. The process according to item 16, wherein the drying in step (c) is carried out at a temperature within the range of from about 40° C. to about 110° C. for a period of time of about 10 s to about 240 s.
18. The process according to item 16 or 17, wherein the thermal treatment in step (e) is carried out at a temperature within the range of about 120° C. to about 190° C. for a period of time of about 10 s to about 240 s.
19. Use of the coated microfibrous web according to any one of items 1 to 14 or of the coated microfibrous web obtainable according to the process of any one of items 16 to 18 as a cover of a radiation protection material; wherein the coated microfibrous web is applied on at least one side of the radiation protection material and wherein the side coated with polyurethane is adjacent to the radiation protection material.
20. A radiation protection device, comprising:
   (α) a radiation protection material; and
   (β) the coated microfibrous web as claimed in any one of items 1 to 14 or the coated microfibrous web obtainable in accordance with the process of any one of items 16 to 18, wherein the coated microfibrous web is applied on at least one side of the radiation protection material and wherein the side coated with polyurethane is adjacent to the radiation protection material.
21. The radiation protection device according to item 20, wherein the radiation protection material is suitable for shielding X-ray radiation.
22. The radiation protection device according to item 20 or 21, wherein the radiation protection material does not contain any lead.
23. The radiation protection device according to any one of items 20 to 22, wherein the coated microfibrous web is applied on both sides of the radiation protection material and wherein the sides coated with polyurethane are each adjacent to the radiation protection material.

The invention is illustrated based on the following example. However, the invention is not limited to this embodiment.

EXAMPLE

A microfibrous web was prepared from polyester microfibers with a fiber thickness of 1 dtex and carbon-containing fibers (Belltron B31, available from Kanebo Gohsen Ltd., Japan). The fibers were processed to form a plain weave with about 70 warp threads/cm and about 37 weft threads/cm with a surface density of 100 g/cm$^2$. The carbon-containing electrically conductive fibers were incorporated in a lattice design 5×5 mm in size.

The microfibrous web had an air permeability of about 9 l/min per dm$^2$ (DIN EN ISO 9237, test surface 20 cm$^2$, 125 Pa) and an electrostatic surface resistance of about $1\times10^8$ ohm (in accordance with DIN 100015-1 at 25% relative humidity and 23° C.). The tear resistance values were about 850 N in warp and about 650 N in weft.

For the example, the microfibrous web was guided over a tenter frame.

The following emulsion mixture of an impregnating solution was prepared to treat the microfibrous web:

60.5% by weight of water
4.0% by weight of bis(2-hydroxyethyl)terephthalate
6.5% by weight of Korasilon® oil R 0.5
24.5% by weight of beeswax emulsion 32%
4.5% by weight of Polysorbate 60 (emulsifier)

The impregnating solution was emulsified by means of a jet-flow agitator.

The treatment, here foulard processing, was carried out using 65 g/l of the impregnating solution. The microfibrous web was dried for 90 s at 60° C.

After drying, a polyurethane-containing coating was applied onto the microfibrous web by means of knife coating. The coating composition had the following composition:

50 parts Impranil DLP-R, Bayer (polymer dispersion)
0.2 parts Agitan 218, Münzing Chemie (deaerating agent)
0.4 parts Afrotin FG, Schill+Seilacher (fungicide)
0.4 parts Byk 333, Byk Chemie (additive for increasing scratch resistance)
0.8 parts Tegophobe 1650, Degussa (water repellent)
1.2 parts colloidal silicic acid
41.7 parts water
0.3 parts Rheolate 255, Elementis (thickener)
4.2 parts Evoral, Schill+Seilacher (fluoropolymer)
0.8 parts Hombitec RM 400, Sachtleben Chemie (matting agent)

The mixing was carried out by means of a jet-flow agitator by adding the ingredients in the order listed above. The stirring time was 5 minutes. The resulting paste was applied as a planar continuous film onto the microfibrous web by means of an air knife.

The coated microfibrous web was gradually dried in a tenter frame in five fields, each 3 m in length and a total time of 2 min.

Drying field 1: 80° C.
Drying field 2: 120° C.
Drying fields 3 to 5: 160° C.

The resulting microfibrous web was examined in accordance with DIN EN 13795-2 in order to clarify its suitability as a cover of radiation protection material in a surgical setting (cfu=colony-forming units).

Barrier Properties:
Penetration of bacteria, dry: log 10 cfu: 0 (DIN EN ISO 13795)
Passage of liquids: >200 mbar (DIN EN ISO 811)
Water repellency>70 (AATCC 22)

Purity:
Microbiological: log 10 (cfu/dm$^2$): <0.3 (DIN EN ISO 13795)
Particulate material: Index particulate material<3.3 (DIN EN ISO 13795)
Particle release: log 10 particles (2-25 μm)<3.7 (DIN EN ISO 13795)

Strength:
Tear propagation resistance: dry: >10 N/5 cm (DIN EN ISO 13937-2)
Tear propagation resistance: wet: >10 N/5 cm (DIN EN ISO 13937-2)
Bursting strength, dry>600 kPa (DIN EN ISO 13795)
Bursting strength, wet: >600 kPA (DIN EN ISO 13795)

The measured values show that the material according to the invention is excellently suited for use as a textile in a surgical setting.

The lead-free radiation protection material produced in Example 1 of WO 2005/024846 was cut in the form of a radiation protection apron. The coated microfibrous web prepared above was cut accordingly and positioned on both sides of the radiation protection material, with the side coated with polyurethane facing the radiation protection material. The microfibrous webs and the radiation protection material were sewn together so that a radiation protection apron was obtained. Due to the use of the microfibrous web described above, the radiation protection apron provided a pleasant-to-wear sensation. Skin irritations were avoided. Moreover, the microfibrous web described above serves as a protective barrier for the sensitive radiation protection inlay. The radiation protection apron showed excellent impermeability to blood, urine, and microorganisms. Moreover, it could be sterilized with ethylene oxide without being damaged. Consequently, the radiation protection apron is very well suitable for use in the medical field.

The invention claimed is:

1. A coated microfibrous web comprising:

(i) a microfibrous web comprising one or more polyesters and/or one or more polyamides and/or one or more polyamide-polyester copolymers and impregnated with an impregnating composition comprising
(a) an aromatic dicarboxylic acid, the carboxylic acid groups of which are each esterified with a diol, and/or
(b) one or more oligomers, each containing 2 to 10 repeating units consisting of a monoester of an aromatic dicarboxylic acid with a diol; and (ii) a layer comprising polyurethane which is present on only one side of the microfibrous web.

2. The coated microfibrous web as claimed in claim 1, wherein the aromatic dicarboxylic acid is a compound of formula (I):

$$HO—(C_{1-6}\text{-alkylene})\text{-}O—C(O)\text{-(aromatic group)-}C(O)—O—(C_{1-6}\text{-alkylene})\text{-}OH \quad (I)$$

wherein the $C_{1-6}$-alkylene groups are independently optionally substituted with one or more fluorine atoms, and the aromatic group optionally contains up to 10 hetero atoms, selected from N, O, and S.

3. The coated microfibrous web as claimed in claim 2, wherein the aromatic group contains up to 12 carbon atoms and optionally up to 4 heteroatoms, selected from N, O, and S.

4. The coated microfibrous web as claimed in claim 2, wherein the compound of formula (I) is a compound of the following formula (II):

(II)

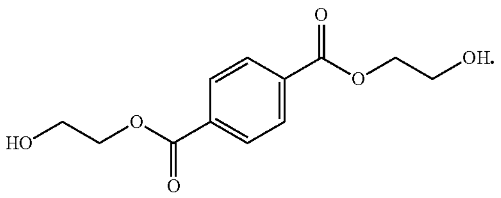

5. The coated microfibrous web as claimed in claim 2, wherein the compound of formula (I) is a compound of the following formula (III):

(III)

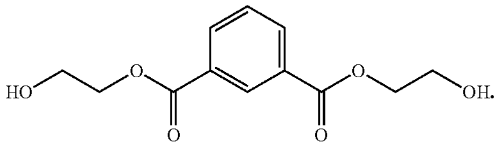

6. The coated microfibrous web as claimed in claim 1, wherein the impregnating composition in addition to the aromatic dicarboxylic acid, the carboxylic acid groups of which are each esterified with a diol, further comprises one or more selected from:

a) one or more silicones, and b) one or more waxes.

7. The coated microfibrous web as claimed in claim 1, wherein the microfibrous web comprises one or more polyesters.

8. A process for producing a coated microfibrous web, comprising the following steps of:

(a) providing a microfibrous web comprising one or more polyesters and/or one or more polyamides and/or one or more polyamide-polyester copolymers;

(b) impregnating the microfibrous web with an impregnating formulation comprising an aromatic dicarboxylic acid, the carboxylic acid groups of which are each esterified with a diol, or with an impregnating formulation comprising:

(I) water, (II) (a) an aromatic dicarboxylic acid, the carboxylic acid groups of which are each esterified with a diol, and/or (b) one or more oligomers, each containing 2 to 10 repeating units consisting of a monoester of an aromatic dicarboxylic acid with a diol, (III) one or more silicones, and (IV) one or more waxes;

(c) drying the impregnated microfibrous web;

(d) applying a coating composition comprising polyurethane on only one side of the dried impregnated microfibrous web; and (e) optionally, thermally treating the coated microfibrous web obtained in step (d).

9. A cover of a radiation protection material comprising the coated microfibrous web obtained by the process as claimed in claim 8;

wherein the coated microfibrous web is applied on at least one side of the radiation protection material and wherein the side coated with polyurethane is adjacent to the radiation protection material.

10. A radiation protection device comprising:

(α) a radiation protection material; and (β) a coated microfibrous web comprising:

(i) a microfibrous web comprising one or more polyesters and/or one or more polyamides and/or one or more polyamide-polyester copolymers and impregnated with an impregnating composition comprising (a) an aromatic dicarboxylic acid, the carboxylic acid groups of which are each esterified with a diol, and/or (b) one or more oligomers, each containing 2 to 10 repeating units consisting of a monoester of an aromatic dicarboxylic acid with a diol; and (ii) a layer comprising polyurethane which is present on only one side of the microfibrous web;

wherein the coated microfibrous web is applied on at least one side of the radiation protection material and wherein the side coated with polyurethane is adjacent to the radiation protection material.

* * * * *